United States Patent
Klinghult et al.

(10) Patent No.: US 7,567,752 B2
(45) Date of Patent: Jul. 28, 2009

(54) IMAGE ALIGNMENT SYSTEM WITH OVERLYING FRAME IN DISPLAY

(75) Inventors: Gunnar Klinghult, Lund (SE); Mats Kleverman, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 239 days.

(21) Appl. No.: 11/614,570

(22) Filed: Dec. 21, 2006

(65) Prior Publication Data
US 2008/0124064 A1     May 29, 2008

Related U.S. Application Data

(60) Provisional application No. 60/867,155, filed on Nov. 24, 2006.

(51) Int. Cl.
G03B 17/00 (2006.01)
G03B 17/18 (2006.01)
H04N 5/228 (2006.01)

(52) U.S. Cl. .................. 396/50; 396/287; 348/208.4
(58) Field of Classification Search .................. 396/50, 396/52
See application file for complete search history.

(56) References Cited

U.S. PATENT DOCUMENTS

| 5,148,604 | A | 9/1992 | Bantien |
| 6,171,880 | B1 | 1/2001 | Gaitan et al. |
| 6,781,623 | B1 * | 8/2004 | Thomas ............... 348/208.4 |
| 2004/0226369 | A1 | 11/2004 | Kang et al. |
| 2006/0197843 | A1 * | 9/2006 | Yoshimatsu ........... 348/219.1 |
| 2006/0226741 | A1 | 10/2006 | Ogura et al. |
| 2007/0223900 | A1 * | 9/2007 | Kobayashi et al. ......... 396/50 |
| 2007/0285663 | A1 * | 12/2007 | Hewitt et al. ............ 356/399 |
| 2008/0044169 | A1 * | 2/2008 | Wernersson .............. 396/50 |

FOREIGN PATENT DOCUMENTS

| EP | 1 071 285 A1 | 1/2001 |
| EP | 1 363 104 A2 | 11/2003 |
| JP | 2004-138737 (A) | 5/2004 |
| JP | 2004138737 A * | 5/2004 |

OTHER PUBLICATIONS

International Search Report and Written Opinion dated Jul. 13, 2007.

* cited by examiner

*Primary Examiner*—Rodney E Fuller
*Assistant Examiner*—Dennis Hancock
(74) *Attorney, Agent, or Firm*—Harrity & Harrity, LLP

(57) ABSTRACT

In an imaging device including an image recording arrangement, a tilt-sensor, and a display, a method may include detecting a tilt-angle for the image recording arrangement using the tilt-sensor; and presenting at least one marker-arrangement via the display indicative of the tilt-angle.

20 Claims, 4 Drawing Sheets

IMAGE ALIGNMENT SYSTEM WITH OVERLYING FRAME IN DISPLAY

RELATED APPLICATIONS

This application claims priority under 35 U.S.C. §119 based on U.S. Provisional Application Ser. No. 60/867,155, filed Nov. 24, 2006, the disclosure of which is incorporated herein by reference.

BACKGROUND

1. Technical Field of the Invention

The present invention relates to devices having an imaging system and, more particularly, a method and an arrangement for aligning an image in an imaging device.

2. Description of Related Art

Many circumstances exist in which a user of a portable imaging device is presented with difficulties in aligning the device in a horizontal or vertical direction while operating the device. Typical examples include situations in which the user, the device, and/or the object to be recorded are moving relative to each other, e.g., use of the device from a moving vehicle, an unsteady hand of the user for whatever reason, following the object to be recorded afoot, etc. Difficulties in aligning the device may also occur when the user holds the device with arm extended at a distance from the head and body of the user. Apart from these situations, difficulties in achieving a proper horizontal or vertical alignment may occur in cases in which the object to be captured has no readily apparent horizontal or vertical reference. A misaligned orientation of an image-capturing device may result in a tilted image with reference to a display orientation of the captured image.

In this regard, portable imaging devices can be provided with various systems for image stabilization. One approach is based on so-called, Optical Image Stabilization (OIS) systems. OIS systems often use a mechanical arrangement in a camera for stabilizing the recorded image by varying the optical path to the sensor (e.g., a charged couple device (CCD) in case of a digital camera). Typically, such systems operate by having a floating lens element that is moved relative to other components of the lens system. Another approach is based on a movable sensor being moved so as to counteract the motion of the camera. A movable sensor is typically presupposing a digital camera.

Image stabilization systems such as those mentioned above, however, are limited to "sharpening" an image by counteracting camera movement experienced during operation of the camera. Although such systems may counteract effects of movement of the camera during image capture, such systems are less effective at counteracting or correcting an angle at which the camera is operated relative to an object in a captured image. It follows that image stabilization technologies are not intended to resolve misalignment effects when it comes to aligning the camera horizontally or vertically.

Accordingly, it would be beneficial to provide an imaging device with an efficient and flexible support for aligning the device horizontally or vertically. For example, it would be beneficial to provide an easy-to-use, adaptable, and intuitive support for achieving and/or correcting image alignment.

SUMMARY

The present invention is directed to providing a user of a portable device with an efficient and flexible procedure for aligning an image. In particular, the present invention is directed to providing a simple, flexible, and intuitive aligning technique. One implementation of the present invention may provide a portable device with an efficient and flexible procedure for aligning an image. In particular, an implementation of the present invention may provide a simple, flexible, and intuitive aligning procedure.

According to a first aspect of the invention which provides a method for aligning a tilted image in a portable imaging device, a device comprises an image recording arrangement for recording images, a tilt-sensor for sensing a tilt-angle for the image recording arrangement, and a display arrangement for presenting images recorded by the image recording arrangement. The method may include detecting a tilt-angle for the image recording arrangement using said tilt-sensor; and presenting at least one marker-arrangement on said display arrangement indicative of said tilt-angle.

A second aspect of the invention is directed towards a method including the features of the first aspect, wherein the step of detecting the tilt-angle is performed by using at least one of: a gyroscope arrangement or an accelerometer arrangement.

A third aspect of the present invention is directed towards a method including the features of the first aspect, wherein the step of presenting at least one marker-arrangement is performed by presenting: a first transversal line substantially fixed to the image recording arrangement so as to display a substantially fixed angle with respect to the recording arrangement, a second transversal line substantially fixed to the horizon so as to display a substantially fixed angle with respect to the horizon.

A fourth aspect of the present invention is directed towards a method including the features of the first aspect, wherein the step of presenting at least one marker-arrangement is performed by presenting: a first longitudinal line substantially fixed to the image recording arrangement so as to display a substantially fixed angle with respect to the recording arrangement, a second longitudinal line substantially fixed to the horizon so as to display a substantially fixed angle with respect to the horizon.

A fifth aspect of the present invention is directed towards a method including the features of the first aspect, wherein the step of presenting at least one marker-arrangement is performed by presenting: a first crosshair substantially fixed to the image recording arrangement so as to display a substantially fixed angle with respect to the recording arrangement, and a second crosshair substantially fixed to the horizon so as to display a substantially fixed angle with respect to the horizon.

A sixth aspect of the present invention is directed towards a method including the features of the first aspect, wherein the step of presenting at least one marker-arrangement is performed by presenting a frame having substantially the same shape as an image presented by the display arrangement and being substantially fixed to the horizon so as to display a substantially fixed angle with respect to the horizon.

A seventh aspect of the present invention is directed towards a method including the features of the sixth aspect, comprising the further step of maximizing the frame within the image.

An eight aspect of the present invention is directed towards a method including the features of the sixth or seventh aspect, comprising the further step of select and store an aligned subset of a tilted image, which subset is defined by the frame.

A ninth aspect of the present invention is directed towards a method including the features of the first aspect, comprising the further step of storing a tilted image together with the tilt-angle at which the image was recorded.

According to a tenth aspect of the present invention directed to a portable imaging device comprises an image recording arrangement for recording images, a tilt-sensor for sensing a tilt-angle for the image recording arrangement, a display arrangement for presenting images recorded by the image recording arrangement, and an aligning-unit being arranged to operatively: detect a tilt-angle for the image recording arrangement using said tilt-sensor; present at least one marker-arrangement on said display arrangement indicative of said tilt-angle.

An eleventh aspect of the present invention is directed towards a portable imaging device including the features of the tenth aspect characterized in that the tilt-sensor is at least one of: a gyroscope arrangement or an accelerometer arrangement.

A twelfth aspect of the present invention is directed towards a portable imaging device including the features of the tenth aspect characterized in that the aligning-unit is arranged to operatively present at least one marker-arrangement comprising: a first transversal line substantially fixed to the image recording arrangement so as to display a substantially fixed angle with respect to the recording arrangement, and a second transversal line substantially fixed to the horizon so as to display a substantially fixed angle with respect to the horizon.

A thirteenth aspect of the present invention is directed towards a portable imaging device including the features of the tenth aspect characterized in that the aligning-unit is arranged to operatively present at least one marker-arrangement comprising: a first longitudinal line substantially fixed to the image recording arrangement so as to display a substantially fixed angle with respect to the recording arrangement, and a second longitudinal line substantially fixed to the horizon so as to display a substantially fixed angle with respect to the horizon.

A fourteenth aspect of the present invention is directed towards a portable imaging device including the features of the tenth aspect characterized in that the aligning-unit is arranged to operatively present at least one marker-arrangement comprising: a first crosshair substantially fixed to the image recording arrangement so as to display a substantially fixed angle with respect to the recording arrangement, and a second crosshair substantially fixed to the horizon so as to display a substantially fixed angle with respect to the horizon.

A fifteenth aspect of the present invention is directed towards a portable imaging device including the features of the tenth aspect characterized in that the aligning-unit is arranged to operatively present at least one marker-arrangement comprising a frame having substantially the same shape as an image presented by the display arrangement and being substantially fixed to the horizon so as to display a substantially fixed angle with respect to the horizon.

A sixteenth aspect of the present invention is directed towards a portable imaging device including the features of the fifteenth aspect characterized in that the aligning-unit is arranged to maximize the frame within the image.

A seventeenth aspect of the present invention is directed towards a portable imaging device including the features of the fifteenth or sixteenth aspect characterized in that the aligning-unit is arranged to operatively select and store an aligned subset of a tilted image, which subset is defined by the frame.

An eighteenth aspect of the present invention is directed towards a portable imaging device including the features of the tenth aspect characterized in that the aligning-unit is arranged to operatively store a tilted image together with the tilt-angle at which the image was recorded.

A nineteenth aspect of the present invention is directed towards a computer program product stored on a computer usable medium, comprising readable program means for causing a portable device to execute, when said program means is loaded in a portable device comprising: an image recording arrangement for recording images, a tilt-sensor for sensing a tilt-angle for the image recording arrangement, a display arrangement for presenting images recorded by the image recording arrangement, and an aligning-unit, the steps of: detecting a tilt-angle for the image recording arrangement using said tilt-sensor; presenting at least one marker-arrangement on said display arrangement indicative of said tilt-angle.

A twentieth aspect of the present invention is directed towards a computer program element having a program recorded thereon, where the program is to make a portable device to execute, when said program means is loaded in the portable device comprising: an image recording arrangement for recording images, a tilt-sensor for sensing a tilt-angle for the image recording arrangement, a display arrangement for presenting images recorded by the image recording arrangement, and an aligning-unit, the steps of: detecting a tilt-angle for the image recording arrangement using said tilt-sensor; presenting at least one marker-arrangement on said display arrangement indicative of said tilt-angle.

Further advantages of the present invention and embodiments thereof will appear from the following detailed description of the invention.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

The present invention relates to portable devices and an associated imaging system. In particular, the invention relates to portable communication devices that include an imaging system. However, the invention is not limited to communication devices. Rather, it can be applied to any suitable portable device comprising a suitable imaging system.

The terms "image" or "images" are intended to comprise still images, a series or sequence of images, as well as moving images, unless otherwise is explicitly stated or is clear from the context.

Figure 1:
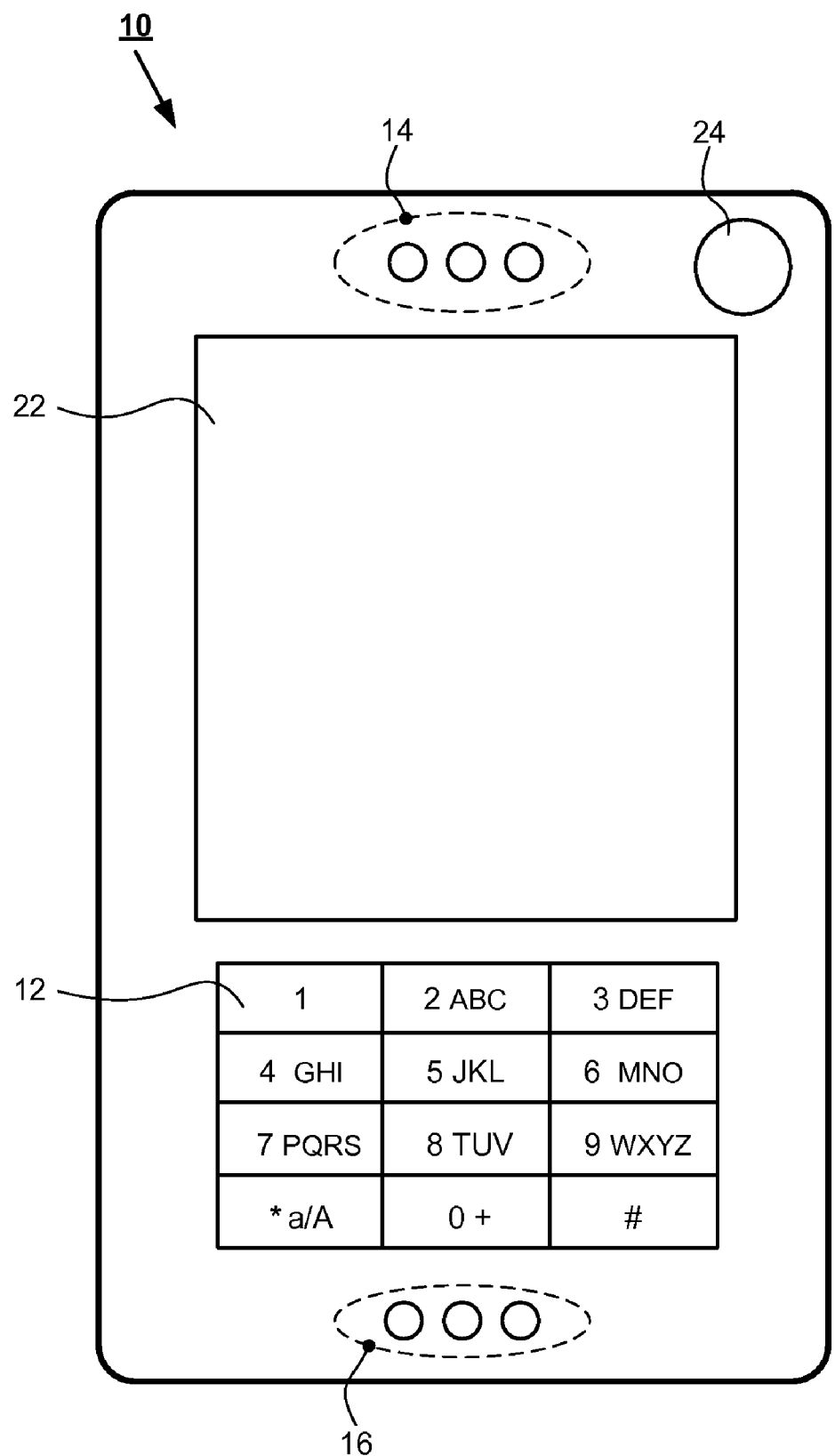
FIG. 1 shows an exemplary device in which systems and methods described herein may be implemented.

A portable communication device according to one embodiment of the present invention is shown in FIG. 1. The device may include a phone 10, such as a mobile cell phone, adapted, for example to operate according to 3G-technology (e.g. W-CDMA or CDMA2000) or possibly according to 2,5-technology (e.g., GPRS) or other communication technology. Information about 3G-technology, 2,5-technology, etc., can be found in specifications from the 3$^{rd}$ Generation Partnership Project (3GPP), available from, for example, www.3gpp.org. Further development has produced techniques for enabling even higher data transfer speeds. In this regard, the so-called, High-Speed Downlink Packet Access (HSDPA), has been developed as an evolution of the 3G technologies. In essence, HSDPA is a mobile telephony protocol, which provides a smooth evolutionary path for 3G networks allowing for higher data transfer speeds. It should be appreciated that the phone 10 in FIG. 1 is just one example of a portable device in which the invention can be implemented. The invention can be used, for instance, in any mobile terminal, such as a PDA (personal digital assistant), a palm top computer, a lap top computer or a smartphone or any other suitable portable device, e.g., such as a digital camera.

In the embodiment shown in FIG. 1, phone 10 may include a keypad 12, a loudspeaker 14, and a microphone 16. Keypad 12 may be used for entering information, such as selection of functions and responding to prompts. Keypad 12 may include any suitable type of input mechanisms, including push-buttons, touch-buttons, and/or a combination of different suitable button arrangements. Loudspeaker 14 may be used to render sounds to a user of phone 10. Microphone 16 may be used to sense audible (e.g., voice) input from the user. In addition, phone 10 may include an antenna to be used for communication with other devices via a network. The antenna may be in-built in phone 10 and hence not shown in FIG. 1.

Further, phone 10 may include a camera arrangement 24 for enabling images to be digitally recorded (or captured) by phone 10. Camera arrangement 24 may include a lens and/or a lens system and an image sensor, such as a CCD (charged couple device) including an integrated circuit with an array of linked or coupled capacitors sensitive to light. Other image sensors are conceivable, e.g., an APS (active pixel sensor) including an integrated circuit with an array of pixels, each containing a photo detector as well as three or more transistors. In existing cell phones and similar devices, it has become increasingly common to use CMOS image sensors, such as APSs.

In contrast to CCDs, CMOS image sensors may be produced at standard manufacturing facilities that produce 90% of all semiconductor chips which results, for example, in economies of scale. Moreover, CMOS processes enable very large scale integration (VLSI), which can be used to incorporate all necessary camera functions onto a single chip to create a compact camera system that is more reliable and obviates the need for peripheral support chip packaging and assembly, further reducing production costs. In addition, APS architectures consume considerably less power than their CCD counterparts. This is a marked advantage in battery-dependent portable applications, such as cell phones.

In addition, the phone 10 may include a display 22 for visual display of functions and prompts to a user of phone 10. Display 22 may be used for rendering images recorded by camera arrangement 24. It should be appreciated that display 22 may be arranged to operatively present images previously recorded, as well as images currently recorded by the camera arrangement 24. In other words, display 22 may be configured to be to operate alternately as a view finder and as presentation device for previously recorded images (e.g., received at phone 10 from another device).

Figure 2:
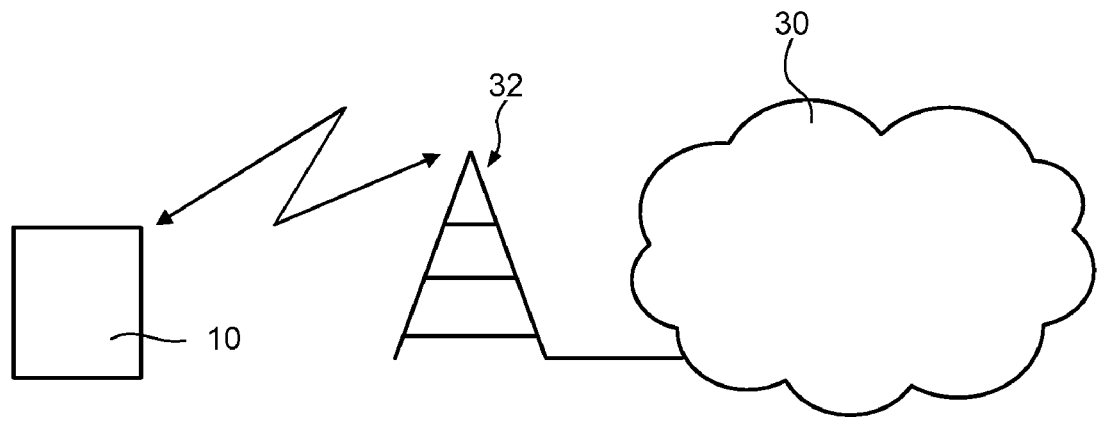
FIG. 2 shows a network in which systems and methods described herein may be implemented.

FIG. 2 shows phone 10 connected to a (cellular) network 30 via a base station 32. Network 30 may include a GSM or a GPRS network, or any other 2G, 2,5G or 2,75G network. Network may include a 3G network such as a WCDMA network. Network 30 may include some type of network, such as Internet, a corporate intranet, a LAN, a PSTN, or a wireless LAN.

Figure 3:
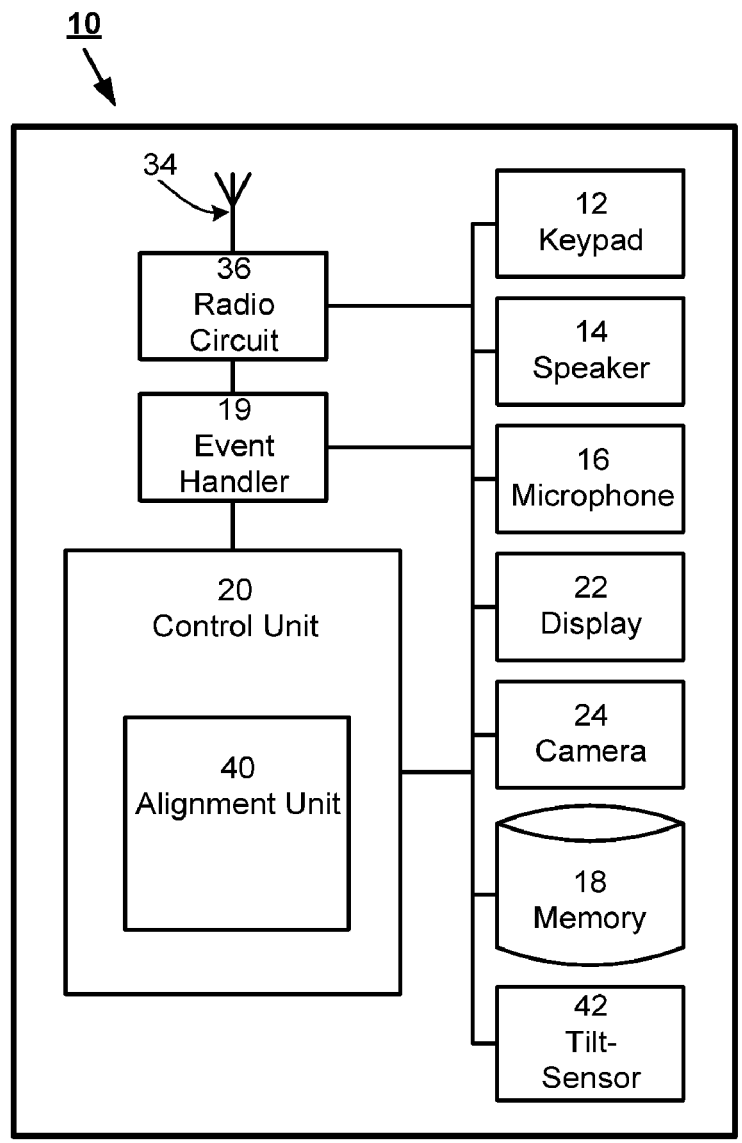
FIG. 3 is a functional diagram of various components of the device in FIG. 1.

FIG. 3 shows functional components of phone 10 in one implementation of the present invention. As discussed above, phone 10 may include keypad 12, speaker 14, microphone 16, display 22, and camera arrangement 24. In addition, phone 10 may include a memory 18 to store data files, for example, image files produced by camera arrangement 24. Memory 18 may be any suitable memory type that is typically used in portable devices.

In addition, phone 10 may include an antenna 34 connected to a radio circuit 36 to enable radio communication with network 30 (FIG. 2). Radio circuit 36 may connect to an event handling unit 19 to handle events, such as outgoing and incoming communication to and from external units via network 30, for example, calls and messages, e.g., SMS (Short Message Service) and MMS (Multimedia Messaging Service).

Phone 10 may include a control unit 20 to control and/or monitor the operation of phone 10. Control unit 20 may be implemented using hardware and/or software, and it may include one or several hardware units and/or software modules, e.g., one or several processor units provided with or having access to the appropriate software and hardware for enabled functions provided by phone 10.

As can be seen in FIG. 3, control unit 20 may connect to keypad 12, speaker 14, microphone 16, memory 18, event handling unit 19, display 22, camera arrangement 24, and radio unit 36 via, for example, a bus. Control unit 20 may thereby control and communicate with the individual units so as to, e.g., exchange information and/or instructions with the units.

It will be appreciated that in addition to the parts and units shown in FIG. 3 there may be further parts and units present in phone 10. The parts and units shown in FIG. 3 may also be connected to more parts and units than that illustrated.

In one implementation of the invention, phone 10 may include a tilt-sensor 42 for operatively detecting a tilt-angle α of camera arrangement 24. Tilt-angle α may be a measure of the inclination or orientation of camera arrangement 24 with respect to the horizon, or, in other words, the inclination with respect to a plumb-line. Other references may be used.

In one implementation, tilt-sensor 42 may include a gyroscope or other mechanism to measure inclination based, for example, on the principle of conservation of angular momentum. For example, the mechanism may include a spinning wheel that is freely disposed on an axle, or the like. The mechanism, once spinning, tends to resist changes to its orientation due to the angular momentum of the wheel. In physics, this phenomenon is commonly characterized as gyroscopic inertia or rigidity in space.

Current gyroscopes can be comparably small, while still providing a sufficiently precise determination of inclination. One such example can be found in U.S. Patent Application Publication No. 2006/0226741 A1 (Ogura et al.), describing a piezoelectric gyro element. Another example can be found in U.S. Patent Application Publication No. 2004/0226369 A1 (Kang et al.), describing a vertical MEMS gyroscope. Alternatively, tilt-sensor 42 may include an accelerometer providing an absolute measure of tilt angle α. The accelerometer may be miniaturized, for example, implemented using MEMS or other techniques. Examples of miniaturized accelerometers can be found, for example, in U.S. Pat. No. 5,148,604 (Bantien), describing a sensor for measuring tilt angle using a sensor element made from a monocrystalline silicon wafer; U.S. Pat. No. 6,171,880 (Gaitan et al.), describing a method for the manufacture of a convective accelerometer and tilt sensor using CMOS techniques; or Patent Application No. EP 1363104 A2 (Almaraz), describing a tilt sensor with a piezoresistive membrane having a weight affixed at its center. Tilt-sensor 42 may be implemented using any device known to those skilled in the art as being suitable for measuring orientation in a portable imaging device.

Tilt-sensor 42 may connect to control unit 20 for operatively supplying a measure of detected tilt-angle $\alpha$ to an alignment-unit 40 being arranged in or being a part of control unit 20 (see e.g., FIG. 3). Being associated with control unit 20 implies that alignment-unit 40 may be implemented using hardware and/or software, and it may include one or several hardware units and/or software modules, e.g., one or several processor units provided with or having access to the software and hardware appropriate for the functions required. Alignment-unit 40 may be arranged to operatively assist the user of cell phone 10 in aligning images recorded by camera arrangement 24.

Figure 4A:
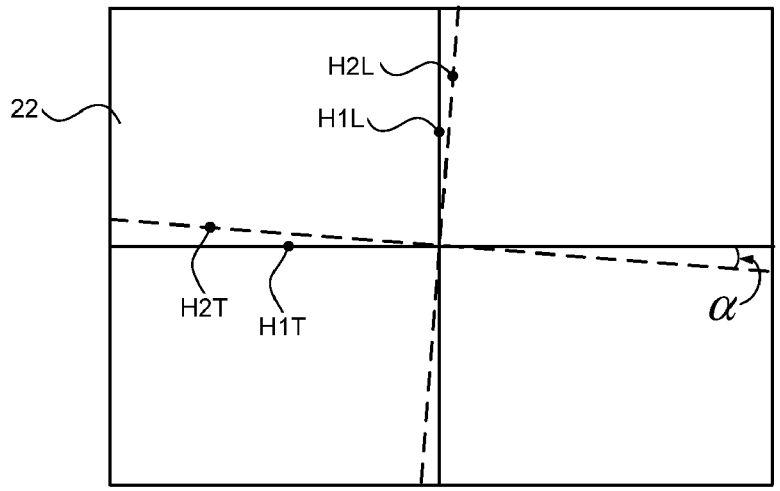
FIGS. 4a-c illustrate the display of the device in FIG. 1 presenting an exemplifying implementation.

As illustrated by FIG. 4a, the user of phone 10 may be assisted in aligning an image by the allocation of a marker-arrangement in the form of, for example, a first crosshair H1 and a second crosshair H2 via display 22 of cell phone 10. Crosshairs H1 and H2 may be superimposed on or otherwise made visible relative to an image rendered via display 22. In one embodiment, a color of crosshairs H1 and/or H2 may be selected so as to specifically contrast a particular image. In another embodiment, a color of crosshairs H1 and/or H2 may vary along a length thereof. Crosshairs H1 and H2 may share the same center point and may be mutually perpendicular. Other sighting references may be used. Alignment assistance may be provided by alignment-unit 42 when display 22 operates as a view finder for presenting of images recorded by camera arrangement 24. In one implementation, alignment assistance may be selected and/or de-selected by the user of phone 10.

First crosshair H1 is illustrated by two solid lines in FIG. 4a, i.e., a first transversal line H1T and a second longitudinal line H1L. In one embodiment, first crosshair H1 may be substantially fixed to camera arrangement 24 so as to render a substantially fixed angle with respect to camera arrangement 24 irrespective of any tilting of camera arrangement 24. Second crosshair H2 is illustrated by two dashed lines in FIG. 4a, i.e., a first transversal line H2T and a second longitudinal line H2L. In one embodiment, second crosshair H2 may be generally fixed to the horizon, so as to display a substantially fixed angle with respect to the horizon irrespective of any tilting of camera arrangement 24. A correlation of second crosshair H2 to the horizon is preferably accomplished by alignment-unit 42 operating on tilt-angle $\alpha$ information obtained from tilt-sensor 42 as described above. In FIG. 4a, second crosshair H2 is shown as having been rotated by tilt-angle $\alpha$ with respect to first crosshair H1. This corresponds to camera arrangement 24 being atilt at tilt-angle $\alpha$ with respect to the horizon. It follows that crosshairs H1 and H2 approach complete alignment (i.e., coincidence) when tilt-angle $\alpha$ approaches zero, i.e., when substantial congruence obtains.

In some embodiments, alignment assistance to be used for an image recorded by camera arrangement 24 may include using a simplified marker-arrangement in the form of, for example, first transversal line H1T and second transversal line H2T, or by only introducing first longitudinal line H1L and second longitudinal line H2L. In other embodiments, crosshairs H1 and H2 may not appear via display 22 until tilt-angle $\alpha$ attains a predetermined value greater than zero. For example, crosshairs H1 and/or H2 may not be visible via display 22 until tilt-angle $\alpha$ reaches 1, 2, 3, 4, 5, 6, 7, 8, 9, or 10 degrees, or any other specified value. In one embodiment, the alignment assistance "activation value" may be configured by a user. In other embodiments, crosshairs H1 and/or H2 may be configured to indicate one or more predetermined levels of tilt (i.e., misalignment) by exhibiting a change in state of one or more characteristics of crosshairs H1 and/or H2. For example, crosshair H2 may be configured to flash, change color, change contrast, change intensity, change in dimension, etc., when tilt-angle $\alpha$ reaches 1, 2, 3, 4, 5, 6, 7, 8, 9, or 10 degrees, or any other specified value(s). Characteristics of crosshairs H1 and/or H2 may revert back to a previous state at the same or another specified value of tilt-angle $\alpha$. For example, crosshair H2 may begin to flash when tilt-angle $\alpha$ reaches 10 degrees, and stop flashing when tilt-angle $\alpha$ decreases to 5 degrees.

Figure 4B:
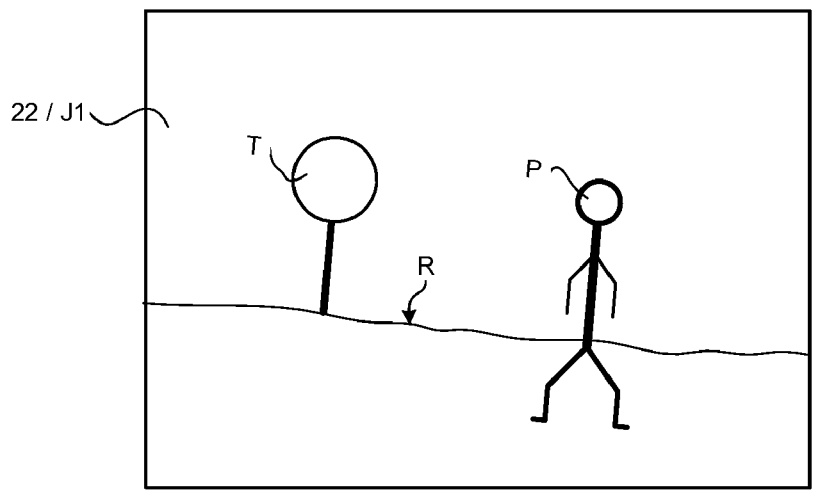

FIG. 4b shows a schematic recorded image J1 including a ridge R, a person P, and a tree T being atilt at an angle of substantially $\alpha$ with respect to the transversal sides of display 22. This corresponds to image J1 having been recorded with camera arrangement 24 being operated at a tilt-angle $\alpha$ with respect to the horizon. It follows that image J1 will be tilted to the same extent with respect to the transversal sides of the rectangular frame or similar border that may encase or delineate image J1 in future reproduction of image J1, e.g., in renderings via computer monitors, TV-monitors, light and/or laser projectors, paper copies, and slide copies or any other media. As such, image J1 may appear askew from the perspective of a viewer of the rendering of image J1.

A recorded image (as image J1 in FIG. 4b) that is not properly aligned (i.e., misaligned) in a horizontal or vertical direction can be automatically corrected. Correction can be achieved, for example, using post processing in a computer or other processing device to which the recorded image has been provided. Naturally, such post processing is facilitated if information indicating tilt-angle $\alpha$ of the image accompanies the image. The post processing can then retrieve tilt-angle $\alpha$ information directly instead of having to analyze the image for making the determination with respect to tilt-angle $\alpha$. In one embodiment, image J1 may include associated information about a particular tilt-angle $\alpha$ at which the image was recorded. The image may be stored together with the subject tilt-angle $\alpha$, for example, in an information field of an image file identifier associated with the image.

Alternatively, orientation correction may be achieved in the first instance, directly in phone 10, since this has the potential of producing an accurately aligned image at the source, which avoids additional processing, such as repeated corrections in the subsequent reproduction, distribution, and/or rendering of the image. Alignment correction performed at phone 10, according to one embodiment of the present invention, for example, includes aligning unit 40 having access to tilt-angle $\alpha$ at which camera arrangement 24 was atilt at the time when the image was captured and recorded. Correction can then be accomplished by simply rotating the image by an angle of $-\alpha$, i.e., re-rotating the image so as to be in alignment. A rotation can be achieved, for example, using existing mathematical relations or algorithms for rotating and possibly translating objects in a plane.

Image rotation may, however, involve a relatively substantial processing that may consume both time and power resources. This is particularly true in view of the ever increasing number of pixels that regularly become available in current digital cameras and the corresponding increase of data to be processed. This is of particular relevance in portable devices, since both processing power and energy are scarce resources in such devices.

Figure 4C:
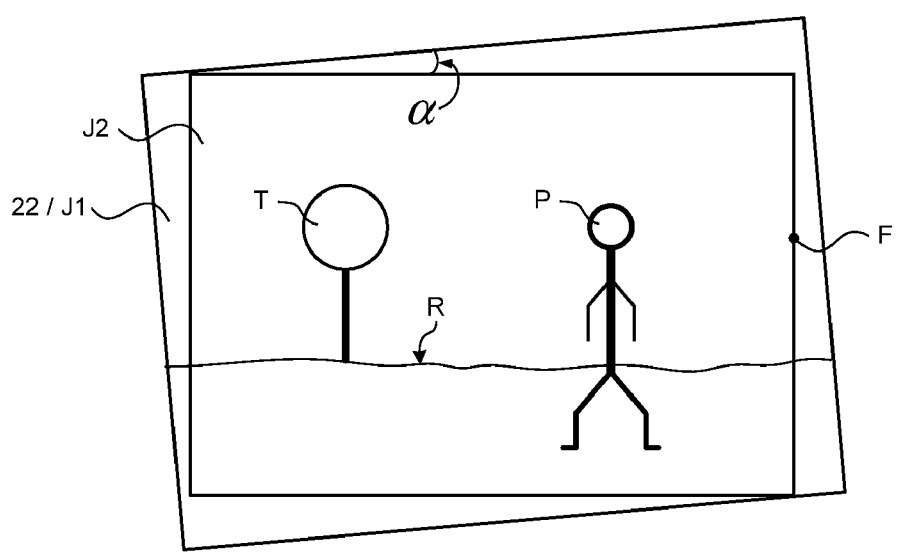

Referring now to FIG. 4c, an alternative method is provided for assisting a user of phone 10 in aligning an image recorded by camera arrangement 24. In FIG. 4c, a frame F has been visibly introduced and overlaid on image J1, being presented via display 22, substantially as described above. This function may be provided by alignment-unit 42 when display 22 operates as a viewfinder for continuously presenting of images captured by camera arrangement 24. In one embodiment, frame F is of substantially similar shape as image J1 presented via display 22, i.e., frame F in FIG. 4c is configured to be rectangular since image J1 is rectangular. In one embodiment, frame F may be maximized within the boundaries of image J1, as presented.

Frame F may be generally fixed to the horizon so as to display a substantially fixed angle with respect to the horizon irrespective of any tilting or similar positioning of camera arrangement 24. A correlation of frame F to the horizon may be accomplished by the alignment-unit 42 operating on tilt-angle $\alpha$ received from tilt-sensor 42, substantially as described above. In FIG. 4c, frame F is shown as having been rotated by an angle $\alpha$ with respect to the transversal sides of image J1.

As will be appreciated, and as can be seen in FIG. 4c, frame F described above will then delimit or enclose an aligned image J2 being a (spatial) subset of original tilted image J1. In other words, a common area of images J1 and J2 is defined by image J1. This has been illustrated in FIG. 4c by showing image J1 in a tilted condition and image J2 in an aligned condition. This provides an operator of phone 10 with a clear indication of that camera arrangement 24 is being operated at tilt-angle $\alpha$. A decreased tilt-angle a may correspond to a decrease in the difference $\Delta$ between the area covered by first image J1 and the area covered by second image J2 such that as tilt-angle $\alpha$ approaches zero, first and second images J1 and J2 approach agreement. An increased tilt-angle $\alpha$ will increase the difference $\Delta$ between the area covered by first image J1 and the area covered by second image J2.

In this manner, a frame, like frame F, having substantially the same shape as the recorded image and that may be substantially maximized with respect to the size of the recorded image and tilt-angle $\alpha$ at which camera arrangement 24 is operated, can be advantageously utilized to facilitate "pre-correction" of potential misalignment by an amount of tilt-angle $\alpha$. Frame F may be used to identify and select an image subset of a tilted image, e.g., such as image J1. As can be seen in FIG. 4c, the subset may represent an aligned image being a part of the original tilted image, e.g., such as the image J2. By this process, a corrected and aligned image can be obtained by simply saving the aligned subset of the tilted image marked by frame F as the captured image. That is, the non-common area between images J1 and J2 may be cropped or otherwise not included in the stored image (i.e., J2). Representational properties of the corrected captured image (i.e., J2) relative to the image J1 may decline as the tilt-angle increases. However, the technique presupposes no rotation or similar image manipulation requiring additional processing which typically consumes both time and energy.

Figure 5:
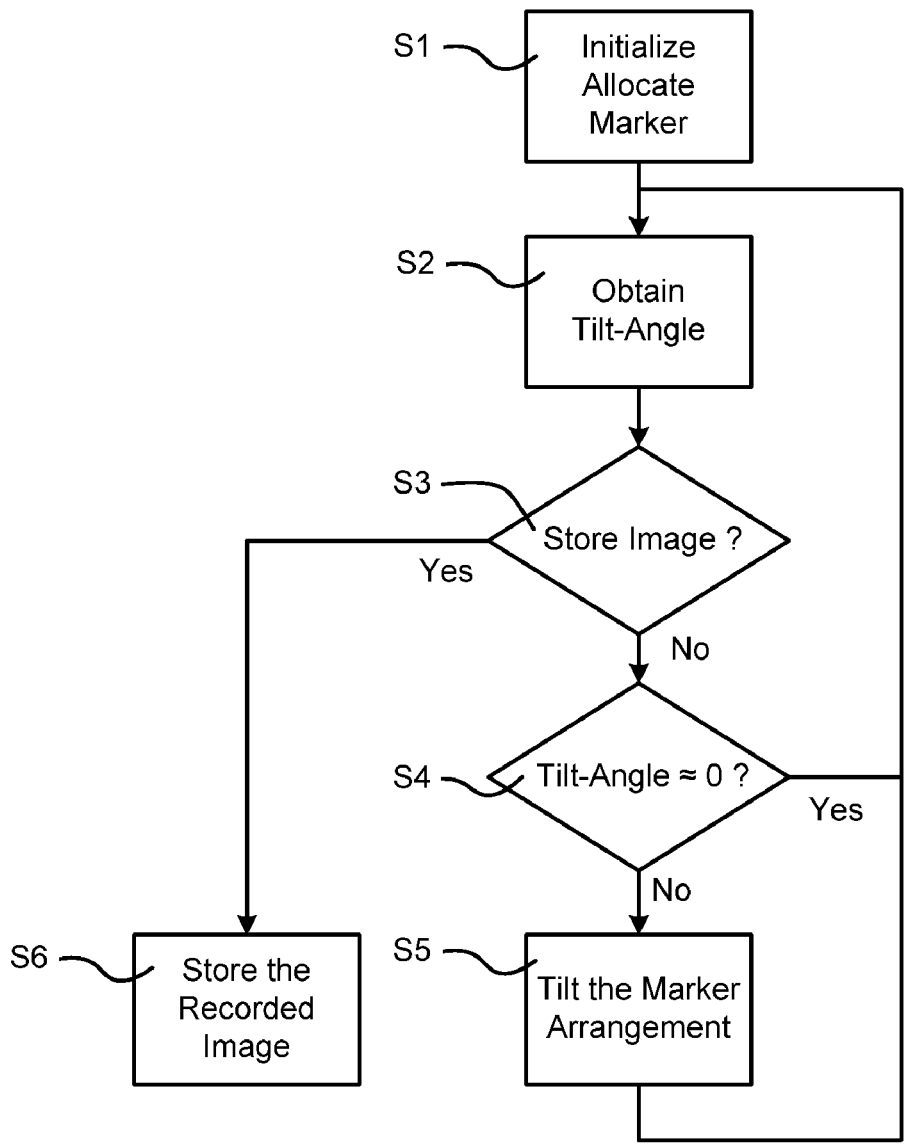
FIG. 5 shows a flow chart of a method of performing the method according to one embodiment of the invention.

Turning now to the function of an exemplifying embodiment of the present invention, which will be described with reference to FIGS. 1-3 together with FIGS. 4a-4c, illustrating display 22 presenting an exemplifying and schematic images J1 and J2, and FIG. 5 showing a flow chart of an embodiment of an exemplary method according to the invention.

As previously explained, an exemplifying portable imaging device, in the form of phone 10, according to an embodiment of the present invention is adapted to record images using camera arrangement 24 provided with a lens or lens system and an image sensor. The image sensor may include a CCD (charged couple device) or an APS (active pixel sensor) or other similar array of light sensitive sensors.

In addition, as will be explained in more detail below, the images recorded by camera arrangement 24 can be aligned using a marker-arrangement H1/H2, F introduced in display 22 so as to overlay an image J1 currently presented via display 22.

The steps in an exemplifying method of aligning an image, depending on tilt-angle $\alpha$ at which camera arrangement 24 was operated when the image was recorded, will now be described with reference to the exemplifying flow chart in FIG. 5. The method may be performed by alignment-unit 40, as schematically illustrated in FIG. 3.

In a first step S1 of an exemplifying method according to an embodiment of the present invention, the aligning function preformed by alignment-unit 40 may be initialized. The initialization may include such actions as allocating a marker-arrangement on image J1 presented via display 22. The marker-arrangement may, for example, be provided in the form of one or two transversal lines H1T/H2T, one or two longitudinal lines H1L/H2L, or both, in the form of two crosshairs H1/H2, or in the form of frame F or some other sighting reference.

In a second step S2 of the exemplifying method, tilt-angle $\alpha$ may be obtained from tilt-sensor 42, which tilt-angle $\alpha$ represents a measure of the angle at which camera arrangement 24 is currently operated with respect to the horizon, i.e., with respect to a plumb-line.

In a third step S3, a determination may be made as to whether the operator of phone 10 has actuated a button or provided some other input so as to store the image recorded by camera arrangement 24, in which case the recorded image or at least a representation of the recorded image is stored (step S6). The image or image representation may be stored, for example, in memory 18 (FIG. 3). Assume that the image is stored together with information indicating tilt-angle $\alpha$ at which the image was recorded.

In a fourth step S4, a determination may be made as to whether obtained tilt-angle $\alpha$ is substantially zero. When obtained tilt-angle $\alpha$ is substantially zero, a new tilt-angle $\alpha$ is obtained according to step S1.

On the other hand, when obtained tilt-angle $\alpha$ is not substantially zero, at least a part of the marker-arrangement is tilted so as to indicate tilt-angle $\alpha$ at which camera arrangement 24 is currently tilted (step S5), i.e., to indicate the horizon and/or the plumb-line.

It should be emphasized that the method described above should be regarded as an example of the present invention. Other embodiments of the method may comprise more steps or fewer steps and the steps must not necessarily be executed in the above given order.

Figure 6:
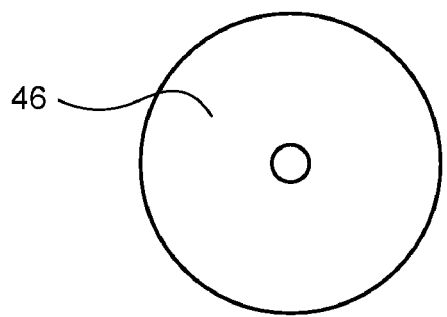
FIG. 6 shows a CD ROM on which program code for executing the method according to the invention is provided.

In general, as previously explained, aligning-unit 40 may be arranged to perform the exemplifying method described above, and provided in the form of one or more processors with corresponding memory containing the appropriate software in the form of a program code. However, the program code can also be provided on a data carrier such as a CD ROM disc 46 as depicted in FIG. 6 or an insertable memory stick, which will perform the invention when loaded into a computer or into a phone having suitable processing capabilities. The program code can also be downloaded remotely from a server either outside or inside the cellular network or be downloaded via a computer like a PC to which the phone is temporarily connected.

The present invention has now been described with reference to exemplifying embodiments. However, the invention is not limited to the embodiments described herein. On the contrary, the full extent of the invention is only determined by the scope of the appended claims.

What is claimed is:

1. In an imaging device including an image recording arrangement, a tilt-sensor, and a display, a method comprising:
    detecting a tilt-angle for the image recording arrangement, using the tilt-sensor;
    presenting at least one marker-arrangement, via the display and indicative of the tilt-angle, where the presenting the at least one marker-arrangement includes:
        overlaying, with a frame, a first portion of an image rendered in the display to a user of the imaging device, where the frame has a substantially similar shape as the image and is substantially oriented to a horizon to indicate a substantially fixed angle with respect to the horizon;
    selecting an aligned subset of the image, where the subset of the image is enclosed within the frame; and
    storing, in a memory associated with the imaging device, the aligned subset of the image.

2. The method in claim 1, where the detecting the tilt-angle includes using information provided by at least one of a gyroscope arrangement or an accelerometer arrangement associated with the imaging device.

3. The method in claim 1, where the presenting the at least one marker-arrangement further comprises:
    providing a first transversal line, substantially fixed to the image recording arrangement, to indicate a substantially fixed angle with respect to the image recording arrangement, and
    providing a second transversal line, substantially fixed to the horizon, to indicate a substantially fixed angle with respect to the horizon.

4. The method in claim 1, where the presenting the at least one marker-arrangement further comprises:
    providing a first longitudinal line substantially fixed to the image recording arrangement to indicate a substantially fixed angle with respect to the recording arrangement, and
    providing a second longitudinal line substantially fixed to the horizon to indicate a substantially fixed angle with respect to the horizon.

5. The method in claim 1 where the presenting the at least one marker-arrangement further comprises:
    providing a first crosshair, substantially fixed to the image recording arrangement, to indicate a substantially fixed angle with respect to the recording arrangement, and
    providing a second crosshair, substantially fixed to the horizon, to indicate a substantially fixed angle with respect to the horizon.

6. The method in claim 1, where a size of the tilt angle is inversely proportional to a size of the first portion of the image.

7. The method in claim 1, further comprising:
    maximizing the frame within the image.

8. The method in claim 1 further comprising:
    cropping a second portion of the image, which is not enclosed by the frame.

9. The method in claim 1, further comprising:
    capturing the image with the image recording arrangement; and
    storing, in the memory, the captured image together with information corresponding to the tilt-angle.

10. A portable imaging device comprising:
    an image recording arrangement to record images;
    a tilt-sensor to sense a tilt-angle of the image recording arrangement;
    a display arrangement to present an image recorded by the image recording arrangement; and
    an aligning-unit to present at least one marker-arrangement via the display arrangement indicative of the tilt-angle,
        where the at least one marker-arrangement:
            includes a frame overlaid on a first portion of the image,
            has a substantially same shape as the image,
            corresponds to a horizon, and
            indicates a substantially fixed angle with respect to the horizon, and
        where the aligning-unit is further to:
            operatively select an aligned subset of the image, where the subset of the image is enclosed within the frame, and
            store, in a memory associated with the portable imaging device, the aligned subset of the image.

11. The portable imaging device in claim 10, where the tilt-sensor comprises one of a gyroscope arrangement or an accelerometer arrangement.

12. The portable imaging device in claim 10, where the at least one marker-arrangement further comprises:
    a first transversal line, substantially fixed to the image recording arrangement, so as to display a substantially fixed angle with respect to the image recording arrangement; and
    a second transversal line, substantially fixed to the horizon, so as to display a substantially fixed angle with respect to the horizon.

13. The portable imaging device in claim 10, where the at least one marker-arrangement further comprises:
    a first longitudinal line substantially fixed to the image recording arrangement so as to display a substantially fixed angle with respect to the recording arrangement; and
    a second longitudinal line substantially fixed to the horizon so as to display a substantially fixed angle with respect to the horizon.

14. The portable imaging device in claim 10, where the at least one marker-arrangement further comprises:
    a first crosshair substantially fixed to the image recording arrangement so as to display a substantially fixed angle with respect to the image recording arrangement, and
    a second crosshair substantially fixed to the horizon so as to display a substantially fixed angle with respect to the horizon.

15. The portable imaging device in claim 10, where a size of the tilt angle is inversely proportional to a size of the portion of the image.

16. The portable imaging device in claim 10, where the aligning-unit operatively maximizes the frame within the image.

17. The portable device in claim 10, where the aligning-unit operatively crops a second portion of the image, which is not enclosed by the frame.

18. The portable device in claim 10, where the aligning-unit operatively stores the image together with information corresponding to the tilt-angle at which the image was recorded.

19. A computer program product stored on a computer usable medium, including readable program means for causing a portable device to execute when the program means is loaded in the portable device, the computer program product causing the portable device to:
- record an image using an image recording arrangement of the portable device,
- sense a tilt angle, using a tilt-sensor of the portable device, for the image recording arrangement,
- present, via a display arrangement of the portable device, for presenting the image recorded by the image recording arrangement,
- detect a tilt-angle for the image recording arrangement using the tilt sensor;
- present at least one marker-arrangement via the display arrangement, indicative of the tilt-angle, where the at least one marker-arrangement:
  - includes a frame overlaid on a portion of the image,
  - has a substantially same shape as the image,
  - corresponds to a horizon, and
  - indicates a substantially fixed angle with respect to the horizon operatively select, using an alignment unit of the portable device, an aligned subset of the image, where the subset of the image is enclosed within the frame, and store, in a memory associated with the portable device, the aligned subset of the image.

20. A portable imaging device comprising:

means for recording images;

means for sensing a tilt-angle of the means for recording images;

means for rendering recorded images;

means for presenting at least one marker-arrangement via said means for rendering recorded images indicative of said tilt-angle, where the means for presenting the at least one marker-arrangement comprises means for overlaying, with a frame, a portion of an image rendered in the means for presenting, where the frame has a substantially similar shape as the image and is substantially oriented to a horizon to indicate a substantially fixed angle with respect to the horizon;

means for selecting an aligned subset of the image, where the subset of the image is enclosed within the frame; and means for storing, in a memory associated with the portable imaging device, the aligned subset of the image.

* * * * *

UNITED STATES PATENT AND TRADEMARK OFFICE
CERTIFICATE OF CORRECTION

PATENT NO. : 7,567,752 B2 Page 1 of 1
APPLICATION NO. : 11/614570
DATED : July 28, 2009
INVENTOR(S) : Gunnar Klinghult et al.

It is certified that error appears in the above-identified patent and that said Letters Patent is hereby corrected as shown below:

Column 12, claim 15, line 61 should read: "first portion of the image."
Column 13, claim 19, line 26 should read: "horizon;"
Column 14, claim 20, line 11 should read: "means for rendering the recorded images;"

Signed and Sealed this

Fifteenth Day of September, 2009

David J. Kappos
*Director of the United States Patent and Trademark Office*